United States Patent [19]

Gerhardt et al.

[11] Patent Number: 4,999,031
[45] Date of Patent: Mar. 12, 1991

[54] REMOVING $CO_2$ AND, IF NECESSARY, $H_2S$ FROM GASES

[75] Inventors: Wolfgang Gerhardt, Gruenstadt; Werner Hefner, Lampertheim, both of Fed. Rep. of Germany

[73] Assignee: BASF Aktiengesellschaft, Ludwigshafen, Fed. Rep. of Germany

[21] Appl. No.: 392,410

[22] Filed: Aug. 11, 1989

[30] Foreign Application Priority Data

Aug. 19, 1988 [DE] Fed. Rep. of Germany ....... 3828227

[51] Int. Cl.$^5$ .............................................. B01D 47/00
[52] U.S. Cl. .......................................... 55/43; 55/48; 55/68; 55/73; 423/229
[58] Field of Search .................... 55/40, 43, 48, 50, 51, 55/55, 68, 73; 423/229

[56] References Cited

U.S. PATENT DOCUMENTS

| | | | |
|---|---|---|---|
| 4,710,211 | 12/1987 | Gazzi et al. | 55/73 |
| 4,714,480 | 12/1987 | Wansink | 55/43 |
| 4,741,884 | 5/1988 | Carter et al. | 55/73 |
| 4,773,921 | 9/1988 | Elgue et al. | 55/73 |

FOREIGN PATENT DOCUMENTS 1506905 2/1980 United Kingdom .

Primary Examiner—Bernard Nozick
Attorney, Agent, or Firm—Keil & Weinkauf

[57] ABSTRACT

$CO_2$ and, if necessary, $H_2S$ are removed from a gas which contains $CO_2$ and may contain $H_2S$ with an absorption liquid by a process in which the gas which contains $CO_2$ and may contain $H_2S$ is treated in an absorption zone with the absorption liquid, the treated gas is removed from the absorption zone, the absorption liquid which is obtained from the absorption zone and is laden with $CO_2$ and may be laden with $H_2S$ is then regenerated in that the said absorption liquid is let down in one or more let-down stages and a let-down gas is taken off at the top of the first let-down stage or, in the case of a plurality of let-down stages, at the top of one or more of the first to penultimate let-down stages, and the partially regenerated absorption liquid obtained from the last let-down stage is, if required, fed to a stripping zone for further regeneration, one or more acid gas streams which contain the $CO_2$ and may contain $H_2S$ being removed from the regeneration stage and the regenerated absorption liquid being recycled to the absorption zone, wherein a bleed stream of completely or partially regenerated absorption liquid is fed to one or more of the let-down stages from which the let-down gas is removed, at a point above the feed of the absorption liquid to be let down.

10 Claims, 2 Drawing Sheets

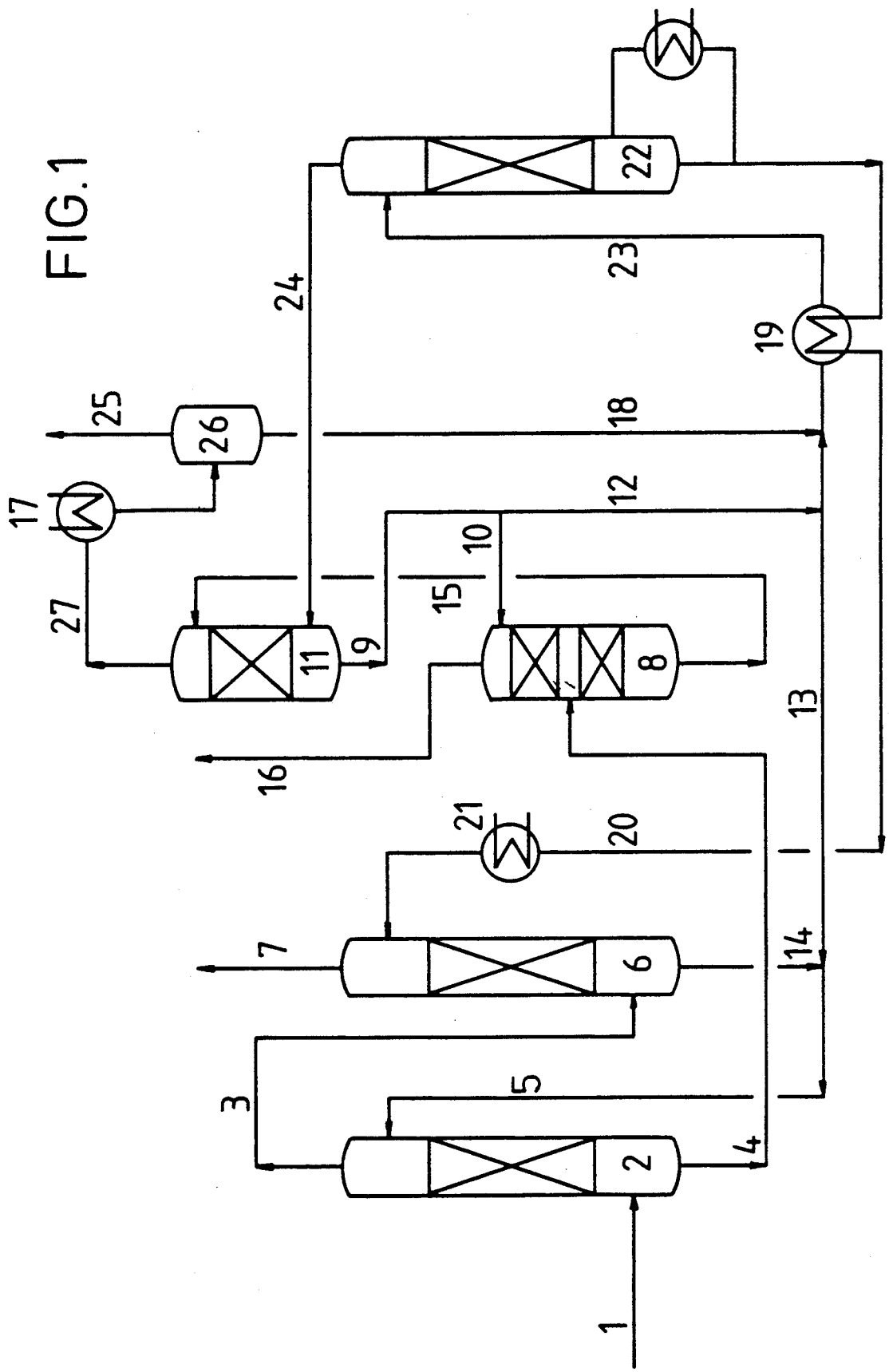

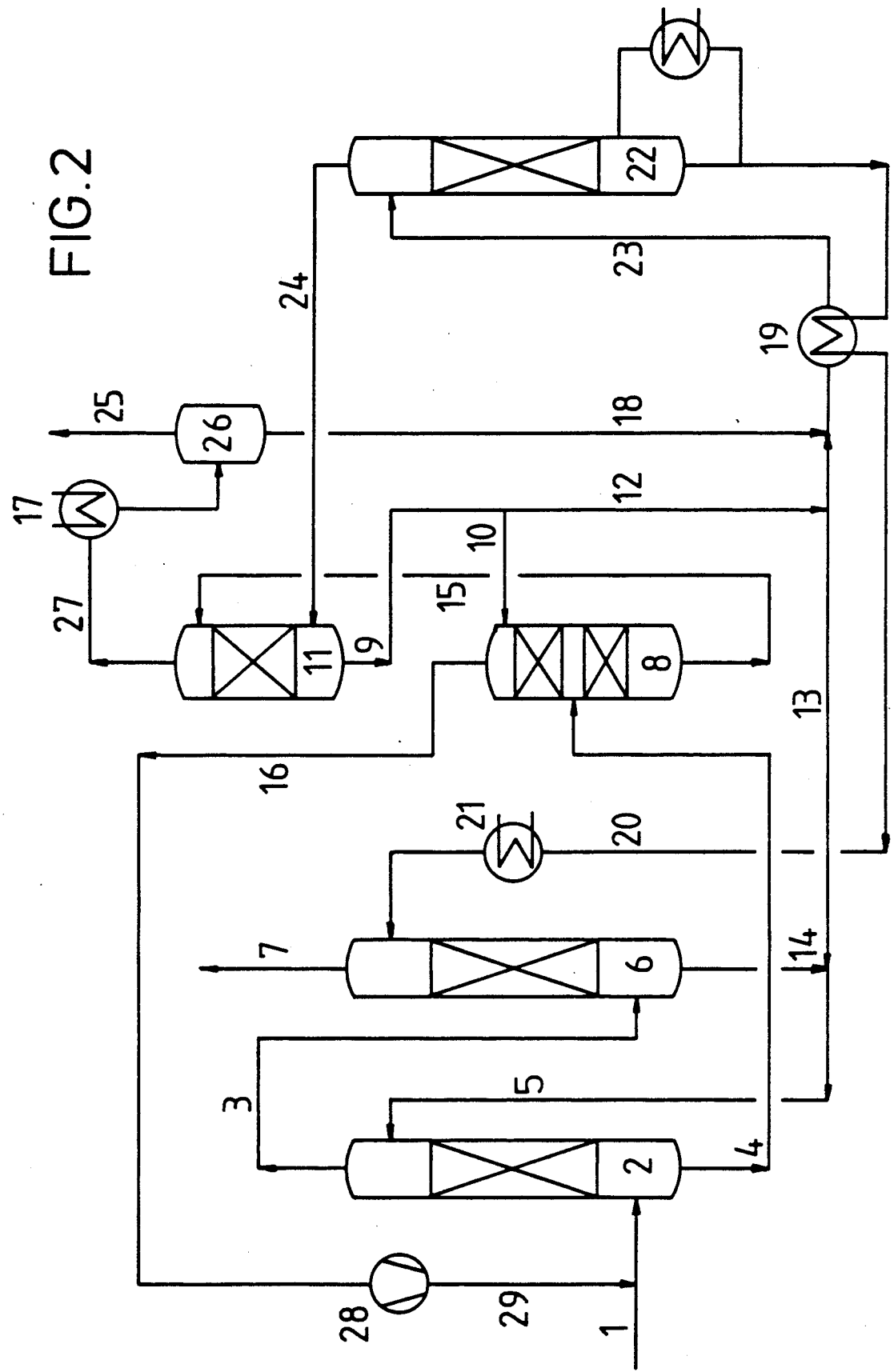

REMOVING $CO_2$ AND, IF NECESSARY, $H_2S$ FROM GASES

The present invention relates to a process for removing $CO_2$ and, if necessary, $H_2S$ from gases by gas scrubbing with an absorption liquid.

In absorption processes for removing $CO_2$ from gases such as synthesis gases and natural gases, the $CO_2$ separated off is frequently recovered as a useful product which is employed for other purposes. For example, the $CO_2$ obtained in the scrubbing of natural or oil-accompanying gases is compressed and then recycled to oil deposits to increase the level of oil recovery Furthermore, the $CO_2$ separated off from the synthesis gas of an ammonia plant in a $CO_2$ scrubbing process is frequently used, in a downstream urea plant, as a starting material for reaction with ammonia to give urea. The $CO_2$ recovered in the ammonia plant is as a rule present in less than the stoichiometric amount, relative to the ammonia obtained in the ammonia plant, for urea formation, so that it is particularly important that the $CO_2$ be recovered in very high yield in the $CO_2$ scrubbing process of the ammonia plant.

German Patent 2,551,717 has disclosed that $CO_2$ and, if necessary, $H_2S$ can be removed from a gas which contains $CO_2$ and may contain $H_2S$ by gas scrubbing with an absorption liquid, the laden absorption liquid first being regenerated in let-down stages and then being fed to a stripper column for further regeneration. When this gas scrubbing process is used for the $CO_2$ scrubbing of an ammonia synthesis gas, the $CO_2$ is generally recovered in a yield of 95 to 97%, the $CO_2$ losses essentially occurring in the exit gas of the first let-down stage, apart from the residual $CO_2$ content of the purified gas, which content is predetermined by the $CO_2$ specification of the purified gas.

Hydrocarbon Processing, March 1988, pages 43–46, has disclosed that, in such a $CO_2$ scrubbing process using a physical solvent, the $CO_2$ yield can be increased so that the gas obtained from the first let-down stage is recycled to the starting gas of the $CO_2$ scrubbing process in the absorber. However, this procedure has the following disadvantages:

The amount of $CO_2$ to be washed out of the starting gas under the relatively high pressure in the absorption column is increased. This leads to an increase in the required absorbent circulation and accordingly to an increase in the diameter of the absorption and regeneration columns.

Furthermore, there is an additional consumption of electric power for compressing the gas recycled to the absorber and for pumping the increased amount of circulated absorbent.

The cooling and compression of the gas streams, and the larger columns, lead to increased capital costs.

It has also been proposed that the additional $CO_2$ required for urea production be recovered by washing $CO_2$ from the combustion gases obtained from the ammonia plant. Owing to the corrosive components, such as $O_2$ and $SO_2$, frequently still present in these combustion gases, considerable problems associated with corrosion of plant components and decomposition of the solvent are frequently encountered in such $CO_2$ scrubbing.

It is an object of the present invention to provide an improved process for removing $CO_2$ and, if necessary, $H_2S$ from a gas which contains $CO_2$ and may contain $H_2S$, the said process overcoming the disadvantages of the known processes.

We have found that this object is achieved, according to the invention, by an advantageous process for removing $CO_2$ and, if necessary, $H_2S$ from a gas which contains $CO_2$ and may contain $H_2S$ with an absorption liquid, in which the gas which contains $CO_2$ and may contain $H_2S$ is treated in an absorption zone with the absorption liquid, the treated gas is removed from the absorption zone, the absorption liquid which is obtained from the absorption zone and is laden with $CO_2$ and may be laden with $H_2S$ is then regenerated in that the said absorption liquid is let down in one or more let-down stages and a let-down gas is taken off at the top of the first let-down stage or, in the case of a plurality of let-down stages, at the top of one or more of the first to penultimate let-down stages, and the partially regenerated absorption liquid obtained from the last let-down stage is, if required, fed to a stripping zone for further regeneration, one or more acid gas streams which contain the $CO_2$ and may contain $H_2S$ being removed from the regeneration stage and the regenerated absorption liquid being recycled to the absorption zone, wherein a bleed stream of completely or partially regenerated absorption liquid is fed to one or more of the let-down stages from which the let-down gas is removed, at a point above the feed of the absorption liquid to be let down.

In the novel process, the $CO_2$ yield, for example in the $CO_2$ scrubbing process of an ammonia plant, can be increased to over 99% in a simple manner by the novel after-scrubbing of the let-down gas of the corresponding let-down stage with partially regenerated absorption liquid from the last let-down stage, without the expensive measures required in the known processes being necessary for this purpose. Because of the small amount of $CO_2$-containing let-down gases, only a small column volume is required for the novel after-scrubbing for washing out the $CO_2$ from the let-down gas, so that the additional capital costs are very low. Since, furthermore, only a small bleed stream of the partially regenerated absorption liquid obtained, for example, from the last let-down stage by reducing the pressure is required for the after-scrubbing process, there is virtually no change in the total heat requirement in the regeneration part of the acid gas scrubbing as a result of the after-scrubbing.

Examples of suitable gases to be treated by the novel process are coal gasification gases, coke-oven gases, natural gases, gases accompanying oil and synthesis gases, application to $CO_2$-containing natural gases and gases accompanying oil being of particular interest for $CO_2$ recovery for tertiary oil production, and application to ammonia synthesis gases being of particular interest for the further use of the recovered $CO_2$ for urea production.

The gases generally have a $CO_2$ content of from 1 to 90, preferably from 2 to 90, in particular from 3 to 60, mol %. In addition to the $CO_2$, the gases may contain $H_2S$ as a further acid gas, for example in amounts of 1 mol ppm to 50 mol %. Since, however, the novel process is advantageously used for recovering $CO_2$ as a useful product, which as a rule should have a very low $H_2S$ content, preferred starting gases are those which contain in general less than 2 mol %, preferably less than 500 mol ppm, in particular less than 50 mol ppm, particularly advantageously less than 10 mol ppm. Particularly for $CO_2$ scrubbing in ammonia plants, virtually $H_2S$-free synthesis gases, for example those having an $H_2S$ content of less than 0.1 mol ppm, are generally used.

Suitable absorption liquids for the novel process are physical and chemical solvents. Examples of suitable physical solvents are methanol, aliphatic amides, such as dimethylformamide, N-alkylated pyrrolidones, such as N-methylpyrrolidone, cyclotetramethylene sulfone and its derivatives, and mixtures of dialkyl ethers of polyethylene glycols, for example the dimethyl ether or methyl isopropyl ether of the polyethylene glycols.

Examples of suitable chemical solvents are alkanolamines, for example primary alkanolamines, such as monoethanolamine, secondary alkanolamines, such as diethanolamine or diisopropanolamine, and tertiary alkanolamines, such as triethanolamine or methyldiethanolamine. In general, when alkanolamines are used, aqueous absorption liquids having an alkanolamine content of from 10 to 70% by weight are employed.

Other suitable chemical absorption liquids are aqueous potassium carbonate solutions which may also contain additives, such as diethanolamine or glycine, and aqueous solutions of the potassium salts of N,N-dimethylaminoacetic acid or N-methylalanine.

Other suitable absorption liquids for the novel process are mixtures of physical and chemical solvents, for example mixtures of cyclotetramethylene sulfone with alkanolamines, such as diethanolamine, diisopropanolamine or methyldiethanolamine, which may also contain water.

Absorption liquids which are particularly advantageously used for the novel process are aqueous solutions of tertiary alkanolamines, in particular methyldiethanolamine, which is generally used as an aqueous absorption liquid containing from 20 to 70, preferably from 30 to 65, in particular from 35 to 60, % by weight of methyldiethanolamine. In an advantageous embodiment of the process, an aqueous methyldiethanolamine solution which additionally contains from 0.05 to 3, preferably from 0.1 to 2, in particular from 0.1 to 1, mol/l of a primary amine or alkanolamine, such as monoethanolamine, preferably a secondary amine or alkanolamine, advantageously methylmonoethanolamine, very particularly advantageously piperazine, is used.

The novel process is carried out by a procedure in which the gas which contains $CO_2$ and may contain $H_2S$ is treated with the absorption liquid in an absorption zone. The absorption may be effected in one or more, preferably two, absorption stages. In the case of a single absorption stage, the gas to be treated is fed into the lower part of the absorption stage, preferably into the lower third, and is passed counter-current to the absorption liquid, which is advantageously introduced into the upper part of the absorption stage, preferably into the upper third. The absorption liquid which is laden with the acid gas $CO_2$ and may be laden with the acid gas $H_2S$ is removed from the lower part of the absorption zone, preferably from the lower third, in particular at the bottom of the absorption zone. The treated gas is taken off at the top of the absorption stage.

When two absorption stages connected in series are used, the gas obtained at the top of the first absorption stage is then fed to a second absorption zone, in which, for further removal of $CO_2$ and, where relevant, $H_2S$, it is treated with absorption liquid which has a lower content of $CO_2$ and, where relevant, $H_2S$ than the absorption liquid fed to the first absorption stage. In the case of the second absorption stage too, the gas to be treated is advantageously fed into the lower part, preferably into the lower third, of this absorption stage and is passed counter-current to the absorption liquid, which is advantageously introduced into the upper part, preferably into the upper third, of the second absorption stage. The product gas is taken off at the top of the second absorption stage. The aqueous absorption liquid initially laden with $CO_2$ and/or $H_2S$ and obtained at the bottom of the second absorption stage is fed to the top of the first absorption stage. In the first and second absorption stages, pressures of in general from 2 to 130, preferably from 10 to 120, in particular from 20 to 110, bar are used. Different pressures may be used in the first and second stages. In general, however, identical or essentially identical pressures are employed in the first and second absorption stages, the pressure differences being due, for example, to the pressure loss occurring in the absorption stages. The absorption stages are advantageously absorption columns, in general packed columns or columns equipped with trays. The absorption liquid which is laden with the acid gas $CO_2$ and may be laden with the acid gas $H_2S$ is removed from the lower part of the first absorption stage.

Thereafter, the absorption liquid which is laden with $CO_2$ and may be laden with $H_2S$ and is obtained from the absorption zone is regenerated by letting down the said absorption liquid in one or more, preferably from two to four, in particular two or three, let-down stages, a let-down gas being obtained at the top of the first let-down stage or, in the case of a plurality of let-down stages, at the top of one or more of the first to penultimate let-down stages. The partially regenerated absorption liquid obtained from the let-down stage or stages can be recycled to the absorption zone. It can, however, also be fed, for further regeneration, to a stripping zone, in which the acid gases $CO_2$ and possibly $H_2S$ still present in this stream are virtually completely stripped off. Examples of suitable stripping agents are steam and inert gases, such as nitrogen. If the gas to be treated contains only $CO_2$ as the acid gas, i.e. is free of $H_2S$, air is also a suitable stripping agent, for example when dialkyl ethers of polyethylene glycols are used as absorption liquids. In a single-stage absorption, if the partially regenerated absorption liquid obtained from the let-down stage or stages is fed to a stripping zone for further regeneration, the regenerated absorption liquid obtained in the lower part of the stripping zone is recycled to the absorption stage, where it is advantageously introduced at the top of the absorption stage. In a two-stage absorption, some of the absorption liquid obtained at the bottom of the last let-down stage is advantageously recycled as a scrubbing liquid to the first absorption stage, and a further bleed stream of the absorption liquid obtained at the bottom of the last let-down stage is fed to the stripping zone for further regeneration. The completely regenerated absorption liquid obtained at the bottom of the stripping zone is recycled to the second absorption stage, where it is advantageously introduced at the top of this absorption stage.

An essential feature of the present process is that a bleed stream of completely or partially regenerated absorption liquid is fed to one or more of the let-down stages from which let-down gas is removed, at a point above the feed of the absorption liquid to be let down. Advantageously, the completely or partially regenerated absorption liquid is fed into the upper part, preferably into the upper third, of the relevant let-down stage or stages, and is passed counter-current to the let-down gas liberated in the relevant let-down stage or stages. The space above the point at which the absorption liquid to be let down is fed to the let-down stage or stages from which the let-down gas is removed is advantageously in the form of an absorption zone, i.e. it is advantageously equipped with packing or with trays, with the result that the $CO_2$ and, where relevant, the $H_2S$ are more effectively washed out of the let-down gas. For washing out the $CO_2$ and, where relevant, $H_2S$ from the let-down gas, only a small bleed stream of the completely or partially regenerated absorption liquid is required. In general, the ratio of the amount of bleed stream of the completely or partially regenerated absorption liquid fed to the after-scrubbing in the let-down stage or stages to the amount of the stream, or the total amount of the streams, of the completely or partially regenerated absorption liquid fed to the absorption zone is from 1:100 to 1:2, preferably from 1:80 to 1:5, in particular from 1:50 to 1:10. When a plurality of let-down stages is used in the regeneration, in general a bleed stream of partially regenerated absorption liquid from the last let-down stage is fed to the after-scrubbing stage according to the invention. However, it is also possible for a bleed stream of completely regenerated absorption liquid obtained from the stripping zone to be used for the after-scrubbing. If the regeneration consists of a single let-down stage and a stripping zone, a bleed stream of regenerated absorption liquid obtained from the stripping zone is fed to the after-scrubbing in the let-down stage.

Where a plurality of let-down stages is used in the regeneration, the acid gas stream containing the $CO_2$ product is advantageously taken off at the top of the last let-down stage and, if necessary, also at the top of the stripper. However, it is also possible to take off further acid gas streams containing the $CO_2$ product at the top of one or more of the penultimate to second let-down stages. Where a single let-down stage and a stripping zone are used for the regeneration, the acid gas stream containing the $CO_2$ product is taken off at the top of the stripping zone.

In another embodiment of the novel process, the let-down gas which has been removed from the let-down stage or stages and treated by the novel after-scrubbing process with completely or partially regenerated absorption liquid is recycled to the absorption zone. Advantageously, the recycled let-down gas is mixed with the starting gas fed to the absorption zone. By this measure, the $CO_2$ yield can be further increased. As a result of the prior treatment of the let-down gas with regenerated absorption liquid and the consequent washing out of the acid gases, only a small residual stream of the let-down gas remains, so that only a very small gas stream is recycled to the absorption zone.

Further details of the invention are described below with reference to two illustrative examples, the process flow chart of which is shown schematically in FIGS. 1 and 2.

In FIG. 1, a gas which contains $CO_2$ and may contain $H_2S$, for example a synthesis gas containing $CO_2$ as the acid gas, is passed via line 1, under pressure, into the bottom of the first absorption column 2. At the same time, 20-70% strength aqueous methyldiethanolamine solution, as the absorption liquid, is fed via line 5 to the top of the first absorption column. The prescrubbed gas obtained at the top of the first absorption column is fed via line 3 into the bottom of the second absorption column 6 for fine purification. At the same time, 20-70% strength by weight aqueous methyldiethanolamine solution, which is obtained from the stripper column 22 and is virtually free of acid gases, is fed, as the absorption liquid, via line 20 to the top of the second absorption column. The scrubbed gas is taken off via line 7 at the top of the second absorption column 6. The aqueous absorption liquid initially laden with the acid gases and obtained at the bottom of the second absorption column is combined with the absorption liquid obtained via lines 12 and 13 from the last let-down stage 11 and then fed via lines 14 and 5 to the top of the first absorption column 2. The aqueous absorption liquid which is laden with $CO_2$ and may be laden with $H_2S$ and is obtained at the bottom of the first absorption column 2 is regenerated by being let down via line 4 into a first let-down column 8, for example via a valve or, preferably, via an expansion turbine. During this procedure, an intermediate let-down gas is liberated from the absorption liquid, which gas is fed counter-current to the partially regenerated absorption liquid removed from the last let-down stage 11 via lines 9 and 10 and introduced at the top of column 8, a high proportion of the acid gases present in the let-down gas being washed out. The let-down gas treated with partially regenerated absorption liquid is removed via line 16. The partially let-down absorption liquid is removed at the bottom of the let-down column 8 and let down via line 15 into let-down column 11. A let-down gas containing the $CO_2$ product is taken off at the top of let-down column 11 via line 27 and, after passing through heat exchanger 17 and separation vessel 26, is taken off via line 25. The let-down absorption liquid removed at the bottom of let-down column 11 via line 9 is, as stated above, fed in a very small amount, for example in an amount of from 3 to 10%, based on the total amount of absorption liquid removed from column 11, via line 10 to the top of let-down column 8. By far the larger part of the let-down absorption liquid is fed further via line 12 and one part is recycled via lines 13 and 5 to the top of absorption column 2 and the other part is fed via line 23 to the top of stripper column 22. The condensation water obtained in the separation vessel 26 is fed via line 18 to the absorption liquid to be further regenerated in stripper column 22.

The regenerated absorption liquid obtained at the bottom of stripper column 22 is passed via line 20 through heat exchangers 19 and 21 and then recycled to the top of the second absorption column 6. The exit gas stream which contains $CO_2$ and may contain $H_2S$ and is obtained at the top of stripper column 22 is fed via line 24, advantageously to the lower part of let-down column 11. However, it is also possible for the exit gas stream obtained at the top of stripper column 22 to be removed from the system without feeding it beforehand to the let-down column 11.

In another illustrative example (cf. FIG. 2), the procedure used in the first illustrative example is adopted, but the let-down gas taken off at the top of column 8 via line 16 is compressed in compressor 28 and added, via line 29, to the starting gas fed via line 1 to absorption column 2.

The Example which follows illustrates the invention.

EXAMPLE

A gas scrubbing plant corresponding to FIG. 1 and having two absorption columns connected in series, two let-down columns connected in series and a stripper column is used. In the absorption columns, 6,410 kmol/h of a $CO_2$-containing synthesis gas are scrubbed with a 40% strength by weight aqueous methyldiethanolamine solution as the absorption liquid. The synthesis gas to be treated is fed, under 35 bar, to the bottom of the first absorption column. The gas to be treated, which originates from a steam reformer, has the following composition:

| | |
|---|---|
| $CO_2$ | 17.9% by volume |
| CO | 0.3% by volume |
| $H_2$ | 60.3% by volume |
| $N_2$ | 20.7% by volume |
| $CH_4$ | 0.5% by volume |
| Ar | 0.3% by volume. |

The temperature of the absorption liquid in the feed to the first absorption column is 73° C. The temperature of the absorption liquid fed to the second absorption column is 50° C. The treated synthesis gas taken off at the top of the second absorption column has the following composition:

| | |
|---|---|
| $CO_2$ | 0.1% by volume |
| CO | 0.4% by volume |
| $H_2$ | 73.3% by volume |
| $N_2$ | 25.3% by volume |
| $CH_4$ | 0.6% by volume |
| Ar | 0.3% by volume. |

The laden absorption liquid leaving the bottom of the first absorption column is fed to the middle of the first let-down column, where it is let down to a pressure of 8 bar, let-down gas being liberated. The upper half of the first let-down column is designed as an absorption zone by incorporating a packing. The absorption liquid removed at the bottom of the first let-down column is then let down to 1.25 bar in the second let-down column. The partially regenerated absorption liquid which has been let down and is obtained at the bottom of the second let-down column is fed, in an amount of about 6%, to the upper part of the first let-down column and is passed counter-current to the ascending let-down gas in the absorption zone of the first let-down column. 28 kmol/h of the let-down gas scrubbed with partially regenerated absorption liquid and having a $CO_2$ content of only 15% by volume are taken off at the top of the first let-down column. About 4/5 of the remaining partially regenerated absorption liquid which has been let down and is removed from the second let-down column are recycled to the first absorption column and about 1/5 is fed to the stripper column. The completely regenerated absorption liquid obtained from the stripper column is recycled to the second absorption column.

The $CO_2$ product is obtained at the top of the second let-down column in a purity of 99.8% and a yield of 99.2%.

If the let-down gas taken off at the top of the first let-down column is recycled, similarly to FIG. 2, to the first absorption column, the yield of $CO_2$ product with a similar purity increases to 99.5%.

COMPARATIVE EXPERIMENT

In a Comparative Experiment, the procedure described in the Example is followed (without recycling of the let-down gas to the first absorption column), except that, in accordance with the conventional processes, the let-down gas obtained in the first let-down column is not subjected to after-scrubbing with regenerated absorption liquid. The $CO_2$ product taken off at the top of the second let-down column has a purity similar to that in the Example but is obtained in a yield of only 96.2%.

We claim:

1. A process for removing $CO_2$ and, if present, $H_2S$, from a gas containing $CO_2$ by contact with an absorption liquid which comprises: treating the gas containing $CO_2$ with the absorption liquid in an absorption zone; regenerating the absorption liquid which is obtained from the absorption zone and which is laden with $CO_2$ by reducing the pressure of the $CO_2$-laden liquid in two to four let-down stages; taking off a gas containing $CO_2$ at the top of one or more of the let-down stages; recycling the regenerated absorption liquid from one or more of the said let-down stages to the absorption zone and feeding a bleed stream of said regenerated absorption liquid to one or more of the let-down stages from which a gas containing $CO_2$ is taken off, the gas being taken off at a point above the feed of the absorption liquid therein.

2. A process as defined in claim 1, wherein the regenerated liquid from the let-down stage is fed to a stripping zone for further regeneration.

3. A process as defined in claim 1, wherein the gas which contains $CO_2$ and may contain $H_2S$ is first treated with absorption liquid in a first absorption stage, the gas obtained at the top of the first absorption stage is fed to a second absorption stage, in which, for further removal of $CO_2$ and, where relevant, $H_2S$, it is treated with absorption liquid which has a lower content of $CO_2$ and, where relevant, $H_2S$ than the absorption liquid fed to the first absorption stage, the treated gas is taken off at the top of the second absorption stage, the aqueous absorption liquid initially laden with $CO_2$ and, where relevant, $H_2S$ and obtained at the bottom of the second absorption stage is fed to the top of the first absorption stage, the absorption liquid which is laden with $CO_2$ and may be laden with $H_2S$ and is obtained in the lower part of the first absorption stage is regenerated by being reduced in pressure in two to four let-down stages, a bleed stream of the stream of absorption liquid obtained at the bottom of the last let-down stage is recycled to the first absorption stage, a further bleed stream of the stream of absorption liquid obtained at the bottom of the last let-down stage is fed to one or more of the first to penultimate let-down stages, a further stream of absorption liquid obtained at the bottom of the last let-down stage is fed to a stripping zone for further regeneration, and the regenerated absorption liquid obtained at the bottom of the stripping zone is recycled to the second absorption stage.

4. A process as defined in claim 1, wherein the gas which contains $CO_2$ and may contain $H_2S$ is treated with absorption liquid in an absorption stage, the treated gas is taken off at the top of the absorption stage, the absorption liquid which is laden with $CO_2$ and may be laden with $H_2S$ and is obtained in the lower part of the absorption stage is regenerated by being reduced in pressure in two or more let-down stages and is fed to a stripping zone for further regeneration, a bleed stream of the stream of absorption liquid obtained at the bottom of the last let-down stage and a bleed stream of the stream of absorption liquid obtained at the bottom of the stripping zone are fed to one or more of the first to penultimate let-down stages, and the stream of absorption liquid obtained at the bottom of the stripping zone is completely or partially recycled to the absorption stage.

5. A process as defined in claim 1, wherein the gas which contains $CO_2$ and may contain $H_2S$ is treated with absorption liquid in an absorption stage, the treated gas is taken off at the top of the absorption stage, the absorption liquid which is laden with $CO_2$ and may be laden with $H_2S$ and is obtained in the lower part of the absorption stage is regenerated by being reduced in pressure in two to four let-down stages, a bleed stream of the stream of absorption liquid obtained at the bottom of the last let-down stage is fed to one or more of the first to penultimate let-down stages, and a further bleed stream of the stream of absorption liquid obtained at the bottom of the last let-down stage is recycled to the absorption stage.

6. A process as defined in claim 1, wherein the absorption liquid used is a physical solvent.

7. A process as claimed in claim 6, wherein the absorption liquid used is a polyethylene glycol dialkyl ether.

8. A process as defined in claim 1, wherein the absorption liquid used is a chemical solvent.

9. A process as claimed in claim 8, wherein the absorption liquid used is an aqueous solution containing from 20 to 70% by weight of methyldiethanolamine.

10. A process as defined in claim 1, wherein one or more of the gases from the let-down stages are recycled to the absorption zone.

* * * * *